Feb. 12, 1957 W. H. ALBEE Re. 24,272

LAND VEHICLE OR LOAD-MOVING DEVICE COMPRISING A FLEXIBLE-WALLED, FLUID-CONTAINING, (PERIPHERALLY-LOADED) ROLLER

Original Filed Jan. 7, 1952 5 Sheets-Sheet 1

INVENTOR.
William H. Albee
BY Morton R. Galane

ATTORNEY

Feb. 12, 1957 W. H. ALBEE Re. 24,272

LAND VEHICLE OR LOAD-MOVING DEVICE COMPRISING A FLEXIBLE-WALLED, FLUID-CONTAINING, (PERIPHERALLY-LOADED) ROLLER

Original Filed

5 Sheets-Sheet 2

INVENTOR
William H. Albee
BY
Willard D. Eaton
ATTORNEY

Feb. 12, 1957 W. H. ALBEE Re. 24,272

LAND VEHICLE OR LOAD-MOVING DEVICE COMPRISING A FLEXIBLE-WALLED, FLUID-CONTAINING, (PERIPHERALLY-LOADED) ROLLER

Original Filed Jan. 7, 1952 5 Sheets-Sheet 3

INVENTOR

William H. Albee

BY Morton R. Galene

ATTORNEY

Feb. 12, 1957 W. H. ALBEE Re. 24,272

LAND VEHICLE OR LOAD-MOVING DEVICE COMPRISING A FLEXIBLE-WALLED, FLUID-CONTAINING, (PERIPHERALLY-LOADED) ROLLER

Original Filed Jan. 7, 1952 5 Sheets-Sheet 4

INVENTOR

William H. Albee

BY Morton R. Gelane

ATTORNEY

INVENTOR
William H. Albee

BY Morton R. Galene

ATTORNEY

United States Patent Office

Re. 24,272
Reissued Feb. 12, 1957

24,272

LAND VEHICLE OR LOAD-MOVING DEVICE COMPRISING A FLEXIBLE-WALLED, FLUID-CONTAINING [, PERIPHERALLY-LOADED] ROLLER

William H. Albee, Carmel, Calif.

Original No. 2,714,011, dated July 26, 1955, Serial No. 265,296, January 7, 1952. Application for reissue July 17, 1956, Serial No. 598,730

20 Claims. (Cl. 180—9)

Matter enclosed in heavy brackets [ ] appears in the original patent but forms no part of this reissue specification; matter printed in italics indicates the additions made by reissue.

This invention relates *primarily* to a land vehicle or a load-moving device comprising a flexible-walled, fluid-containing roller for sustaining a load applied to its periphery, as distinguished from a load applied, as in the case of a wheel, through an axle or the like.

Its chief objects are to provide economy, efficiency, convenience, durability and adaptability in a device of this type.

More specific objects are to provide a roller of this type having such shape and such structural features as to avoid destructive localization of strains in the wall of the roller; to provide a roller adapted for facility of steering of the assembly; to provide improved cushioning of the load; to provide in conjunction with a roller of this type improved means for compelling the roller as a whole to travel at the same speed as that of its load and, relatedly, to provide improved anti-friction means for permitting the periphery of the roller, at its load supporting position, to travel at the necessarily faster speed than that of the load; to provide an improved self-propelled assembly of this type; to provide a device of this type adapted to be conveniently and effectively braked; and to provide improved procedure for using a roller of the type above referred to, especially in the matter of steering the assembly and in the matter of employing such a roller as a lifting-jack.

The attainment of these objects is of special value in the moving of loads over rough, uneven or rocky ground; or vertically in relation to a rough mine-shaft wall, for example; or over soft or otherwise difficult terrain, as in the case of sand, swamp, snow or mud; or upon water, with the distensible roller providing a buoyancy means for the load; or over a surface subject to being damaged by other types of load-moving devices; or under conditions such that, as in some military situations, it is desirable to avoid the leaving of an easily discernable track.

Figure 3:
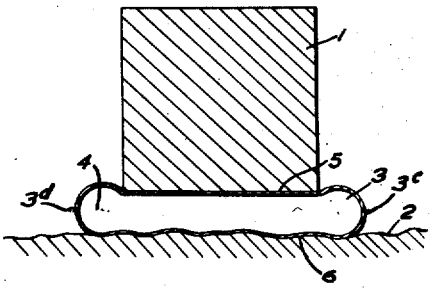
Fig. 3 is a section, transverse to the direction of travel, of members of the assembly shown in Fig. 1.
Figure 4:
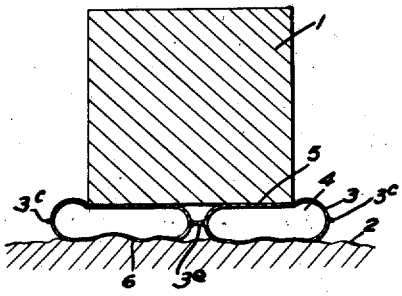

Fig. 4 corresponds to Fig. 3 except that it shows an alternative type of roller device.

Figure 1:
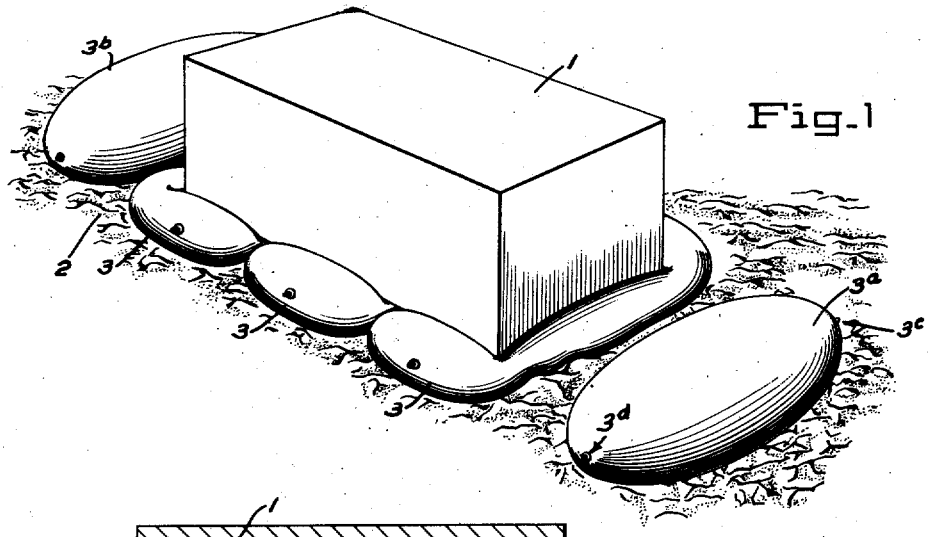
Fig. 1 is a perspective view of a block shaped load and, in their operative relation thereto, a set of rollers embodying my invention in its preferred, simple form for this type of use.
Figure 5:
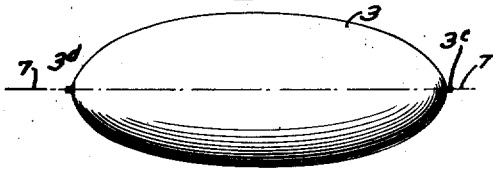

Fig. 5 is a front or rear side-elevation of one of the rollers shown in Fig. 1 as it appears when inflated but not under load.

Figure 6:
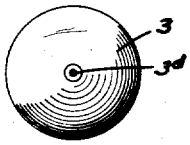

Fig. 6 is an end elevation of the same.

Figure 7:
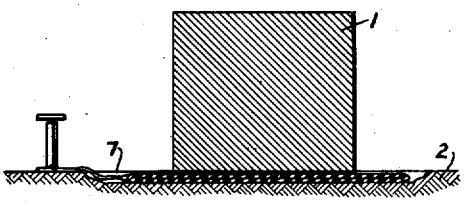

Fig. 7 is a vertical section illustrating a preparatory stage in the use of one of the rollers as a lifting jack for getting the load and the roller in proper relationship for transportation of the load upon and supported by the roller.

Figure 8:
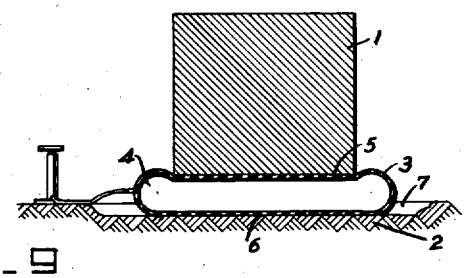

Fig. 8 is a like section illustrating a later stage.

Figure 9:
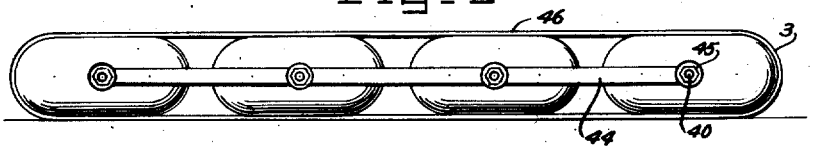

Fig. 9 is an elevation of a plurality of the rollers, provided with journals and joined in series by spacer bars connecting their journals.

Figure 10:
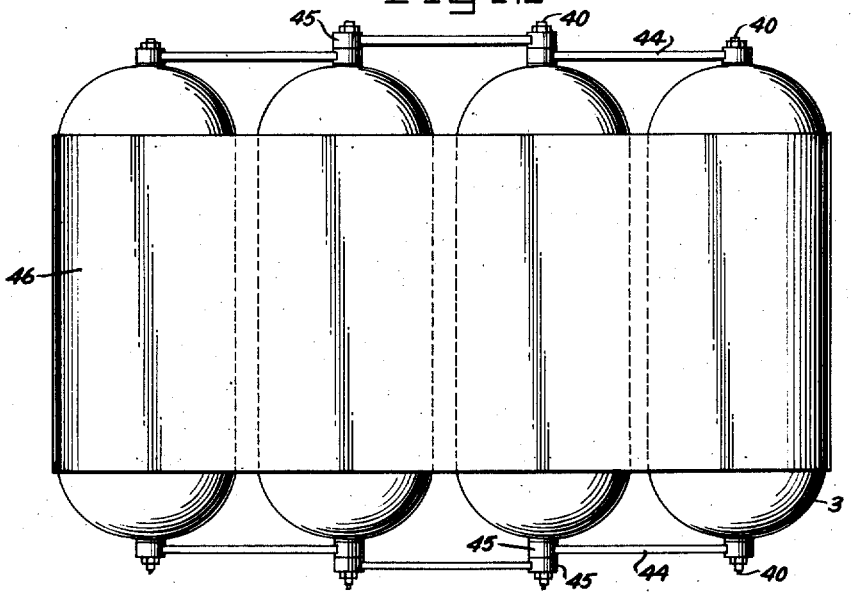

Fig. 10 is a plan view of the assembly shown in Fig. 9.

Figure 11:
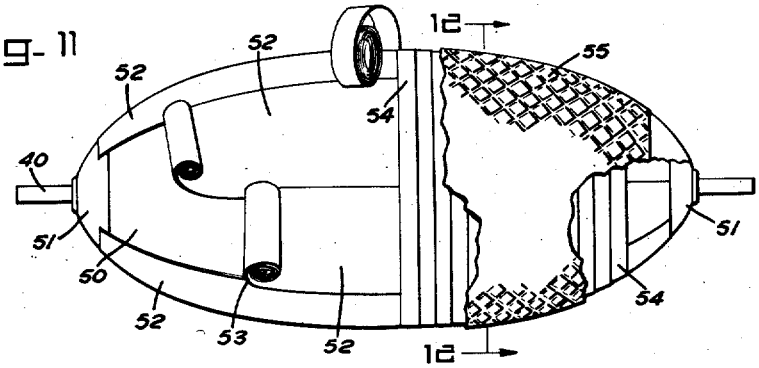

Fig. 11 is an elevation showing a preferred method of constructing a roller embodying the invention.

Figure 12:
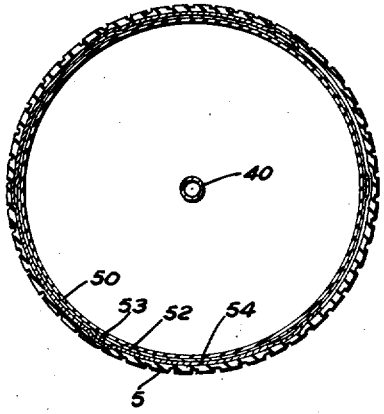

Fig. 12 is a section on line 12—12 of Fig. 11.

Figure 13:
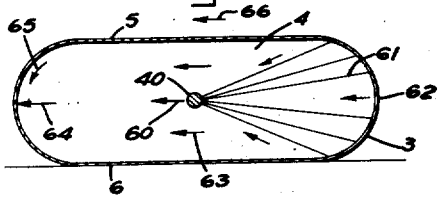

Fig. 13 is a diagrammatic fore-and-aft section of one of the rollers provided with a pulling axle, illustrating forces that are present when the roller is pulled by means of the axle.

Figure 14:
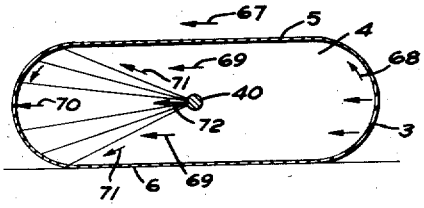

Fig. 14 is a corresponding section illustrating forces that are present when the roller is peripherally driven.

Figure 15:
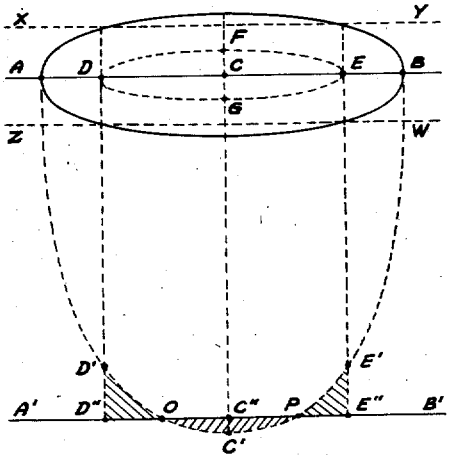

Fig. 15 is a diagram illustrating factors that are present in the operation of the preferred type of roller and that can be employed for improved steering of the assembly comprising the roller.

Figure 16:
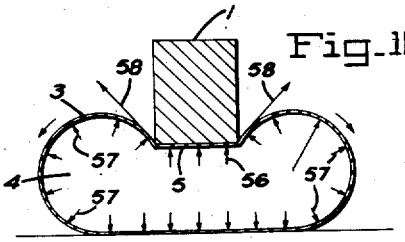

Fig. 16 is a diagrammatic section illustrating forces that are present in the supporting of a load under certain conditions.

Figure 17:
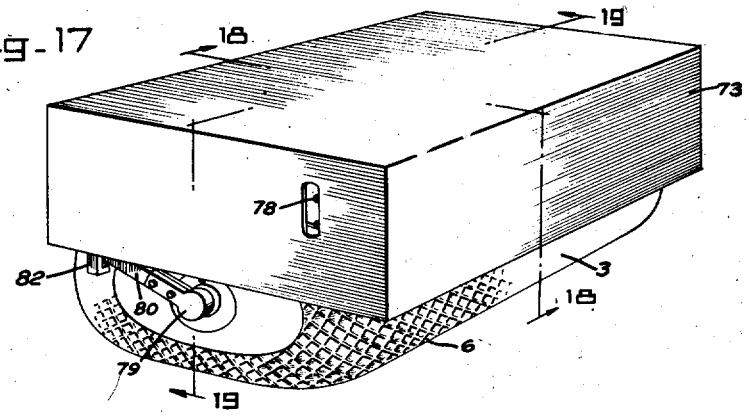
Figure 18:
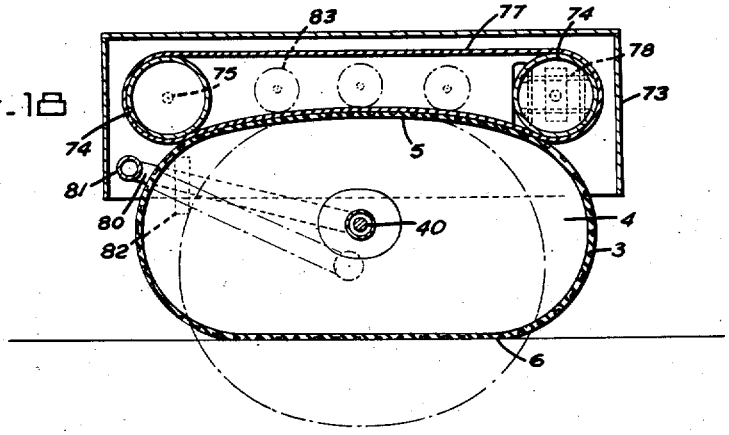
Figure 19:
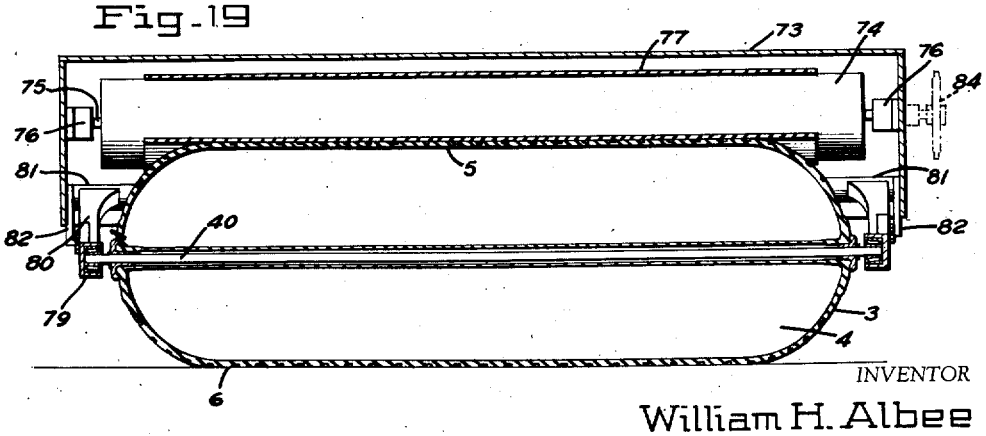

Figs. 17, 18, and 19 are respectively a perspective view, a fore-and-aft section, and a section transverse to the direction of travel, of a self-propelled assembly comprising a roller of the type under consideration, but with parts of the power means omitted.

Figure 20:
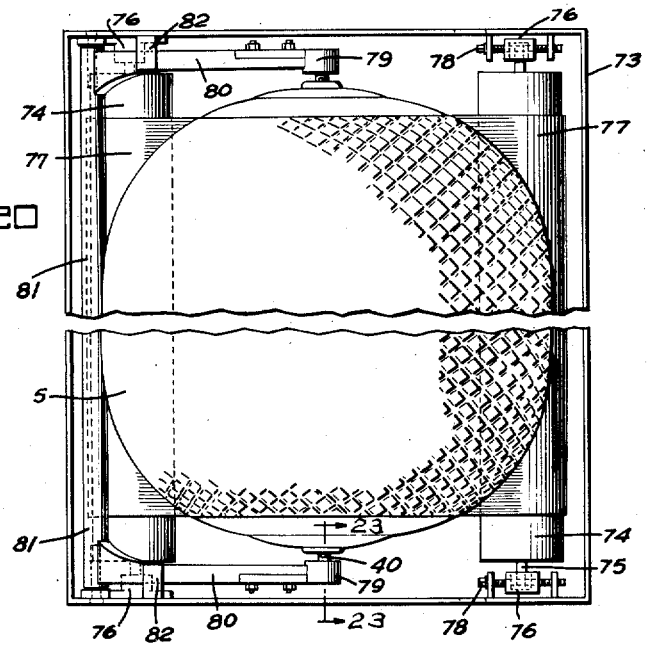

Fig. 20 is a foreshortened bottom view of the assembly shown in Figs. 17 to 19.

Figure 21:
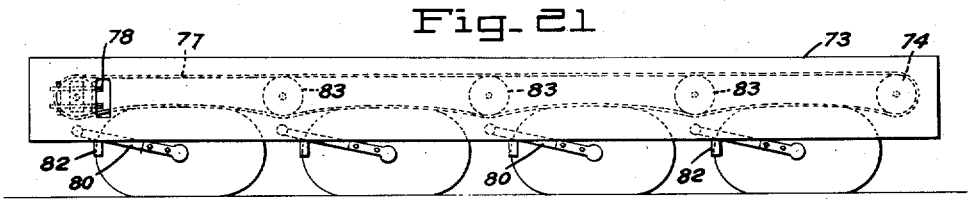

Fig. 21 is a side elevation of a load-moving device embodying my invention and comprising a series of the rollers.

Figure 22:
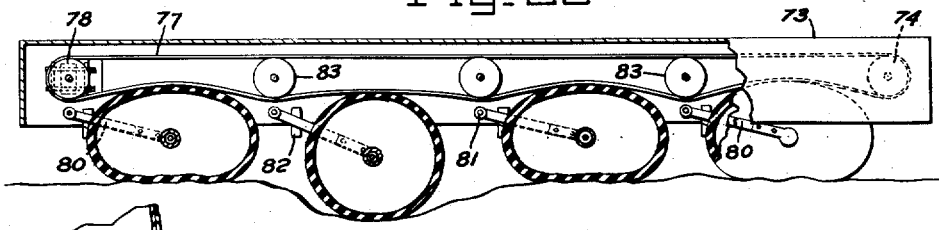

Fig. 22 corresponds to Fig. 21 except that parts are shown in section.

Figure 23:
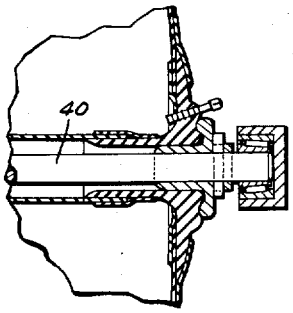

Fig. 23 is a fragmentary section on line 23—23 of Fig. 20.

Figure 24:
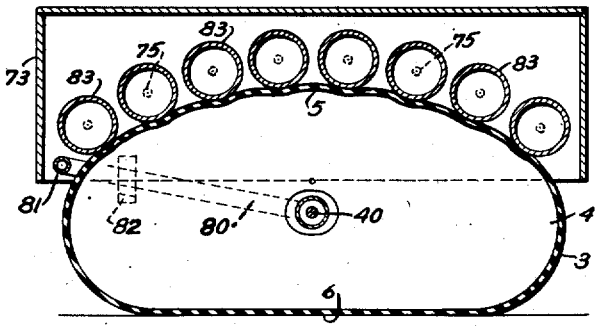

Fig. 24 is an assembly somewhat similar to that shown in Figs. 17 to 20.

In Fig. 1 a block-shaped load 1 is supported upon a plurality of rollers or envelopes 3, 3 for movement over rough ground 2 by a driving force applied to the load by hand. In this operation the rollers under the load of course move forward only half as fast as the load, so that rollers in succession are released at the rear of the load, as at $3^b$, and rollers in succession are placed in front of the load, as at $3^a$, to be moved onto by the load.

Figure 2:
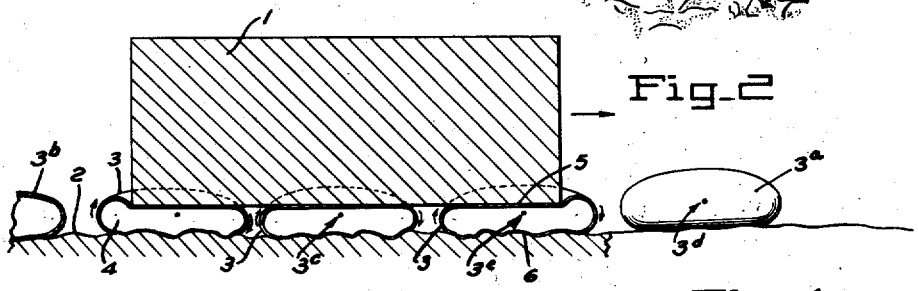
Fig. 2 is a fore-and-aft section of the assembly shown in Fig. 1, except that one of the rollers is broken away and another is shown in elevation.

The rollers contain so little fluid that roughness of the ground, as at 6, Fig. 2, is compensated for by easy indentation of the flexible and appreciably elastic wall of the roller, without substantial vertical movement of the load, even in the case of obstacles of large size being "swallowed" by the roller, yet, in spite of the small amount of fluid in each roller, the roller can sustain a heavy load because of the large area of its contact with the under face of the load which is incident to the low fluid pressure per square inch within the roller.

The load is easily moved because substantially the only frictional resistance to its movement is the internal friction in the wall of the roller that is incident to its flexing as it moves forward in the manner of a self-laying track, and the slight rolling friction of the outer surface of the roller. The load is very effectively cushioned not only because of the roller's easily varying area of contact with the ground and its "swallowing" of obstructions but, also, because of its easily varying area of contact with the load as an additive cushioning factor.

Each bag is provided with a standard tire-valve and stem $3^c$ or other suitable inlet-outlet valve device, and preferably with a relief valve $3^d$ to prevent a very heavy load, or excessive filling, from bursting the roller. Loss of fluid through the relief valve is compensated by resulting spread of the roller's areas of contact with the load and with the ground.

The chief distinction from the prior art, of the rollers shown in Figs. 1, 2, 3, 5 and 6, and of the rollers that preferably are employed in all of the embodiments of the invention that are shown in the drawings, is that the roller has, in conjunction, the feature that it is axially elongated, as distinguished from a spherical peripherally loaded roller; the feature that it is smoothly, curvedly and symmetrically crowned in its load-contacting part, so that upon increase of loading, either static or dynamic, its ground-contact and load-contact areas spread lengthwise of the roller as well as circumferentially of it, for a desirable load-sustaining and cushioning effect; and the feature that the roller, being made preferably of cord-reinforced rubber, has sufficient resilient stretchability of its wall to permit it to stretch along the perimeter of its load-contact area, for example, to relieve radiant compressive stresses in the contact area resulting from flattening of the crowned-roller wall. Thus the contact area can spread without buckling or wrinkling of the wall, which is to say without destructive localization of strains in the wall. The same of course applies to the ground-contact area.

The smoothly crowned shape in the load-contacting part of the roller also provides for a new and highly advantageous method of steering, which requires only that the roller's contact area with the ground be shifted toward the right end of the roller, as by rightward tilting of the roller, if it is to be steered to the right, for example, whereupon the roller steers to the right somewhat in the manner of a conical roller traveling upon a flat surface.

The manner in which this effect is obtained, even when the roller is greatly flattened by the load, is illustrated in the diagram of Fig. 15.

There the roller, having the axis of rotation A—B, is represented in outline, as viewed from above, by the full-line ellipsoidal figure, and its straight-travel ground-contact area is represented by the dotted ellipsoidal figure, within and symmetrical with relation to the full-line figure.

The roller has a greater cross-sectional perimeter at its middle, C, than at either of the extremities, D or E, of the ground-contact area, and yet at each revolution of the roller a relatively long circumferential zone of the wall material at C must pass the area of ground contact while shorter circumferential zones of wall material at D and at E must pass the ground-contact area, with graduation of this factor, of course, from C to E and from C to D.

Thus, taking the right-hand half EFG of the ground-contact area, for example, wall surface in a part of this area close to C has to have, in straight travel, a backward ground slippage matched against a forward ground-slippage of ground-contacting surface of the roller closer to E.

In a revolution of the roller a point on its surface at E, but for its compelled forward slippage, would go only to ground point E′; whereas it is compelled to go to ground point E″, and a point on the roller's surface at C, but for its compelled backward slippage, would go to ground point $C^1$, whereas it is compelled to have such backward slippage that it goes only to the ground point C″.

The graduation of these mutually compelling slippage factors is represented by the curved line $C^1PE^1$ and, in case of rightward shifting of the area of ground contact, by the extension $E^1B$ of the curved line $C^1PE^1$.

At some position in each half of the ground-contacting portion of the roller, represented by P in the right-hand half and by O in the left hand half of the diagram, there is neither forward nor backward ground slippage.

In the assumed case of rightward tilting of the roller for rightward steering, considering the roller as moving away from the line Z—W and toward the line X—Y, the zone of ground-contact shifts to the right and in this shifting the no-slippage zone P, as it is thought will be clear, migrates to progressively smaller-perimeter positions nearer the right-hand end of the crowned roller while the no-slippage zone O migrates rightwardly to progressively greater-perimeter positions nearer the maximum-perimeter middle of the roller.

With the right-hand no-slippage zone P thus decreasing in perimeter while the no-slippage zone O increases in perimeter, it will be clear that the zone O travels over the ground faster than the zone P, which is to say that the roller follows a path which curves to the right.

One simple way for tilting the roller for steering is simply to shift the load's center of gravity to the right or to the left according to the direction of steering desired, as by adding weight to one side or the other of the load 1 in Fig. 1.

Another simple way is to apply to the load 1 of Fig. 1, permissibly by hand, a horizontally directed tilting force.

Other ways of effecting lateral tilting of the roller for steering are made possible by employment of load-applying devices of embodiments of the invention that are hereinafter described.

This steering capability is at its best when the load is supported by a single one of the rollers, as in Figs. 17 to 20 of the drawings, but is not eliminated by the employment of a plurality of the rollers, abreast or in tandem, under the load.

Fig. 4 shows two rollers abreast of each other, for lateral stability of the load, but connected by an axial tie 3e to keep them from escaping, laterally of their rolling movement, from under the load.

A preferred type of construction for long-wearing, heavy-duty envelopes is illustrated in Figs. 11 and 12 and comprises an inner-tube of elastic rubber 50, over which is cemented two end sections of moulded rubber or rubber-impregnated nylon fabric 51 and one or more layers of rubber-impregnated nylon fabric 52 cut in "orange-peel" sections with cemented laps 53 of sufficient width to develop a tensile strength equal to that of the fabric, and over which is cemented one or more layers of rubber-impregnated nylon fabric 54 wound around the load-carrying portion of the bag and rubber-cemented thereto, and a scuff coat or moulded tread of pliable rubber 55 cemented to the entire outside of the bag, thicker over the tread surfaces; the entire structure is vulcanized into an integral mass by application of proper heat and pressure.

Many other methods of construction with various materials may be used to achieve the desired results.

The fluid mass 4 contained within the envelope 3 may be either gaseous or liquid. For practical purposes, ordinary air is usually used as the gas, and ordinary water as the liquid although many other gases, such as $CO_2$, and/or many other liquids, may be used.

Gas is preferable as a fluid mass for lightness of weight in handling, and for its properties of elasticity, compression, and expansion. Gas is usually used where the loads to be floated require internal pressures within the envelopes of less than 5 pounds per square inch; also, when more than two envelopes are employed under one object, as in Figure 1, to take advantage of the expansion and compression properties of gas as the object is moved over uneven ground. Where envelopes are used in the manner of ordinary rollers, Figs. 1 and 2, and are to be inserted in front of a moving object, the envelopes are usually only partially inflated at atmospheric pressure, and develop internal pressure as the load compresses the gas. Gas will absorb shock better than liquid. Gas is also useful at low temperatures, where ordinary liquids would solidify.

Liquid is preferable as a fluid mass 4 for its property of relative incompressibility. Where very heavy weights are to be moved, requiring pressures of 5 pounds or more, even up to 100 pounds per square inch, liquid will provide an incompressible volume to maintain the required amount of separation between inside surfaces of the envelope, particularly when they are used as rollers, as described above; whereas gas would compress and allow the envelopes to squash too much in attaining the required pressure. In many cases, both liquid and gas are used together, liquid to limit the squashing of the envelope, and gas for its cushioning and shock-absorbing effect. Liquid is used to fill envelopes to be used as rollers under water, although enough gas may be added to cause the roller to barely stay at the surface.

To float an object on the envelope, pressure is exerted by the envelope-contained mass of fluid in two principal ways as illustrated in Fig. 16; by direct pressure 56 against the areas 5 of the envelope 3 in contact with the object 1, and by the tensile force 58 transmitted thru the envelope material resulting from pressure 57 of the fluid 4 against the free walls of the envelope 3. Where the bottom of an object is essentially flat and extends beyond the area of contact in all directions, the direct presure is the predominant force of support. Where the area of contact 5 is relatively small, and the envelope extends outward and upwards, as in Figure 16, the tensile force may dominate.

For preliminary use as a jack, for getting the load and the envelope in proper relationship for transportation of the load upon and supported by the envelope, a deflated envelope, Fig. 7, may be inserted in very narrow spaces 7 between an object 1 and the ground 2, and then inflated with sufficient fluid 4 (gas and/or liquid) under pressure to float and lift the object the required amount, Fig. 8.

The envelopes are sufficiently resistant to stretching to contain the fluids under the required operating pressure within predetermined and limited volumes, thereby forcing the contained fluid 4 to support the loads 1. The envelopes are flexible and pliable, which is to say appreciably elastic, to allow the containers to conform as much as possible to the [irrigularities] *irregularities* of the surface of the ground 2 and of the supported objects 1, thereby distributing the loads evenly over substantially the entire area 6 of the ground in contact with the envelopes, and preventing excessive concentration of load at any point of contact.

In the ideal situation, the entire bottom of an object 1 would be floated on one fluid-containing envelope 3 large enough to project from all sides, Figure 3, but since the movement ahead for any appreciable mount, the object 1 would be transported off the top of the fluid mass 4 by frictional contact 5 with that portion of the envelope moving over the top of the fluid mass, another fluid-filled envelope 3 must be ready to receive the load 1, similar to the way in which solid cylindrical rollers are used, Figs. 1 and 2.

The optimum arrangement of an object on more than one envelope in actual use is to provide as many supporting envelopes as can be accommodated for a given area of said object to approach the ideal distribution of load, which would occur if the entire area of the object were supported by 100% surface contact with a single envelope.

The stability of an object floated on envelopes is similar to stability of a similar shape floated on water. Where the center of gravity of the object is comparatively low, it will remain in a stable upright position on the envelope. Where the center of gravity of the object is comparatively high, the object may have a tendency to turn sideways, or "capsize." This is because the fluid 4 in the bag 3 is free to move from side to side. In this case, it is advisable to use envelopes paired end to end, to achieve stability similar to that developed by two floats in water side by side instead of one, Figure 4.

An improvement to the plain envelope 3 is the addition of a rigid axle 40, Figs. 11 and 17 to 20, inserted in or attached at the longitudinal axis of the envelope to establish an axis of rotation and to aid in controlling the direction of movement of the envelope and the supported load. Such an axle, *in this preferred embodiment*, is in no sense a load-bearing axle, since all of the load of the supported object is imposed upon and carried by the load-supporting surface of the envelope.

A forward pulling force applied to such an axle of course causes the load-bearing surface of the roller to move forward at approximately twice the linear speed of the axle.

Referring to Fig. 13, which represents a cross-section of an envelope perpendicular to its axle, a force applied on the axle 40 in the direction of the arrow 60 is transmitted thru fabric under tension 61 to the back side 62 of the bag, which pushes contained fluid 4 forward as represented by the arrows 63, creating pressure on the front of the bag 64, forcing bag material intension to rotate forward, 65, in front of the fluid mass, pulling the load-bearing surface 5 of the bag in tension in a forward direction 66.

Conversely, a forward force applied tangentially to the load-bearing surface of the bag will cause the axle to move at approximately half the speed of the load-bearing surface in the direction of movement.

This is illustrated in Fig. 14. A force 67 applied tangentially to the load-bearing surface 5 of the bag 3 pulls fabric under tension 68 around the fluid mass 4, causing the fluid to move forward 69, because of the contact of the roller with the ground, with the fluid transmitting pressure 70 against the front of the bag, and thru tension 71 in the fabric a forward force 72 is applied to the axle.

The axle may also serve as a means for steering an envelope, or changing its direction of movement. A downward force exerted on one end of the axle, perpendicular to the ground, will cause the axle to tilt toward the ground at said end, and will cause the roller to tend to pivot around said end in moving.

In some cases, as in Figs. 9 and 10, it is desirable to space a series of envelopes in tandem with their axles parallel and at predetermined distances from each other. Envelopes with axles attached may be spaced with the spacing bars 44 fitted to axles 40 with bearing means 45.

A series of envelopes arranged in tandem may be surrounded from end to end by an endless belt 46 for aiding in transporting an object from one envelope to the next. It will be apparent that the axis of rotation of each envelope so employed will travel at one half the speed of the covering belt 46, so that the distance between the axis of rotation of any two envelopes will remain substantially constant, the connecting bars 44 preventing any substantial displacement of any of the rollers as a whole in relation to the others.

Envelopes with or without axles may be used as bearings in raceways with uneven bearing surfaces, in contrast to ordinary solid bearings which require highly finished bearing surfaces. Envelopes used as bearings may be filled with many types of fluid, depending on the functions to be performed.

A simple vehicle unit is illustrated in Figs. 17 to 20, in which a load-supporting roller and its load are compelled to travel at the same speed, and in which the vehicle can be self-propelled. A load-carrying "saddle" frame 73 of box form as shown, or any other form necessary for functioning, is attached to the envelope 3, which is in the usual partially inflated condition; that is, it encloses sufficient fluid 4 to separate the load-carrying portion 5 of the envelope from that portion of the envelope in contact with the ground 6. The frame 73 has journaled therein and encloses saddle rollers 74 which rotate on axles 75 and anti-friction bearings 76. These rollers support an endless belt 77. The belt is wide enough to extend beyond the ends of the envelope 3 and is sufficiently taut to transmit the load from the rollers 74 to the top or load bearing portion 5 of the envelope. Means 78 may be provided to adjust the spacing between rollers 74 to maintain the necessary tautness of the belt 76. The load applied by the object is supported by the frame 73 and thence through the bearings 76 and axles 75 to the belt 77 and thence to the load-carrying portion 5 of the envelope and not through any member serving as an axle of rotation of the envelope. Suitable tread patterns may be formed in the load bearing surface of the envelope to minimize slippage both forward and sideways.

An axle 40 or stubs of an axle protrude from each end of the envelope 3 to maintain the envelope centered beneath the belt 77 and frame 73. The axles are not load-supporting axles, and they may be hollow with holes leading from inside the envelope to valves in the ends of the axles. The axles are held in position by means of bearings 79 and vertically movable guides 80 or linkages. The vertically movable guides 80 allow the distance between the axle 40 and the belt 77 to vary, as illustrated in Fig. 18, in conformity with variations in load and terrain, but keep the axle positioned beneath the belt. The guides 80 may be rigidly joined together by suitable means 81 to cause them to move in unison, thereby always maintaining the axle 40 parallel to the load-bearing frame 83. Means 82 may be provided to limit the vertical movement of the envelope axle to keep the envelope at all times in pressure contact with the belt.

The saddle assembly may comprise additional rollers or bogies 83, Fig. 18, to help distribute the frame load onto the belt 77 and reduce the belt tension on the main rollers 75.

In the form of the above described preferred embodiment, the vehicle unit has many general fields of application, including vehicles, dollies, floats, rollers and conveyors.

In the field of vehicles, this vehicle unit takes the place of the combined unit represented by a pair of wheels, tires, an axle, and springs.

Such a vehicle as here designated may be used as a single unit, or paired side by side for greater stability, or in multiples assembled in tandem. A multiple of envelopes may be assembled in tandem, as in Figs. 21 and 22, by means of positioning arms 80 to a single common load-bearing frame 73, in which case a single belt 77, with one pair of belt tighteners 78, may serve for all envelopes, with suitable bogie rollers 83 to distribute a portion of the load to each envelope. In this case, the bellying of the belt between rollers will help to compensate for major irregularities of the ground, as shown in Figure [26] 22.

One or more units may also be pivoted and tilted and thus made to turn in a lateral direction for steering a vehicle.

Power to self propel the vehicle, from a motor not shown, may be applied to one or more of the load-bearing rollers 74, through a sprocket 84, for example, which will drive the load-supporting surface 5 of the envelope in the direction of movement, through the belt 77 when there is such a belt interposed between the saddle rollers 74, 83 and the ground-contacting roller 3.

In like manner, braking force may be applied to either the rollers 74 or the belt 77.

For certain uses of these vehicles it may be desirable to eliminate the load-bearing belt altogether, as in Fig. 24, in which case a plurality of closely spaced parallel bogie rollers 83 may be mounted on axles 75 and anti-friction bearings in fixed position to frame 73, thereby eliminating the necessity for belt tighteners. In this case, the bogies 83 rest directly on the load-carrying surface 5 of the envelope 3.

The invention provides the many advantages that are set forth in the above statement of objects.

Vehicles supported by these units can transport heavy loads over irregular and unstable ground, such as swamps and muskeg, since the large area of contact with the ground will allow low pressure. They can also transport extremely heavy loads over rocky and firm ground such as encountered in a desert country, where the ground will support higher pressures, such as 10 pounds or more per square inch without displacement.

Bodies of water, such as rivers and lakes, may also be negotiated by such vehicles, which will carry a limited pay-load, depending on the relative volume of air in the envelopes.

Vibration and jars due to travel over rough terrain are reduced to a minimum by the envelopes, especially if the envelopes are filled with air, and are used at low pressures.

In the field of dollies, the vehicle units can be attached permanently or temporarily to objects to be moved, and will function similarly to the way they do on a vehicle. They are particularly useful for movement of extremely heavy objects, for example, buildings, heavy machinery, prefabricated bridges, large units of masonry, etc. Dollies of such design are useful in moving heavy objects over fine surfaces without damages, such as heavy safes over finely finished floors.

Used as upside-down dollies, such units as herein described are particularly adapted for handling objects having uneven or delicate surfaces, such as polished plate glass, etc.

Used upside down in series, such units as herein described can be used as conveyors for handling objects without jarring. In some cases, a continuous belt over the top of several units will be found helpful to carry small objects over the top of a series.

For military bridges large units with special load-bearing frames may be quickly assembled in tandem into floating bridge sections on shore, taking advantage of cover from enemy fire, and then rolled in sections into the water. In some cases, bridges could be completely assembled on shore, the completed bridge shoved progressively out into the water as assembly progressed. Piers for landings on tidal flats can be assembled in similar manner.

In the field of roller guides, or bearings, assemblies as described have many uses, for example, attached to the sides of mine shaft carriages, they will conform to the irregularities of the shaft walls, eliminating the necessity for fixed guides.

Many other similar uses will be manifest.

As above mentioned, the belt in Figs. 17 to 20 is wide enough to extend beyond the ends of the maximum load-sustaining contact areas of the envelope or roller 3, and, transversely of the direction of travel, the belt is held to straight or rectilinear form by the cylindrical bogies 83.

There are two major advantages inherent in this construction, in conjunction with the crowned form of the roller. One is that it has less fore-and-aft sliding friction (made manifest in the above discussion of the Fig. 15 diagram) than if the bogies were omitted and the belt had such stretchability that it would be forced into conformity with the crowning of the roller. The other of the two advantages is that the holding of the belt to rectilinear form, in the direction transverse to the line of travel, results in the load being wholly supported by direct fluid pressure from below, the extremities of the flattened contact area of the distensible roller being always at some distance inward from the side edges of the belt, so that there is no sharp bending of the wall of the distensible roller such as occurs at the positions of the arrows 58 in Fig. 16, or at the side edges of the bottom of the load 1 in Fig. 1.

Both of these advantages are especially important in the case of heavy loads and in the case of high fluid pressure within the distensible roller.

Further modifications are possible without departure from the scope of the appended claims.

In the appended claims the words "axially elongated" are used as meaning that, when the defined fluid-distensible roller is distended and free of load, its flexible wall is, in axial section, a part of an ellipsoidal figure having a length, along the rolling-axis of the roller, substantially greater than the maximum diameter of the roller in fore-and-aft section, and the word "crowned" is used as meaning that, in the distended and unloaded condition, the fluid-distensible roller is of gradually increasing diameter in directions from its ends towards its middle, as in the case of a crowned-pulley.

In the case of a self-propelled vehicle (Figs. 17 to 20 and 24) the fluid-containing bag or envelope drives the frame 73 through the links 80, the latter being under longitudinal compression as pusher elements, whereas in the case of a towed vehicle (Figs. 21 and 22, for example) the vehicle drives the bag or envelope, through the links 80, the latter being under longitudinal tension as pulling elements. To cover both types of vehicles, the words "horizontal-propulsion means" are used in the appended claims with reference to the pushing or pulling links 80 and equivalents thereof.

I claim:

1. A load-moving device comprising an axially elongated, flexible-walled, fluid-distensible roller for supporting the weight of a load applied to its outer surface for transportation of the load thereon, said roller having, when distended and free of load, a smoothly curved, symmetrically crowned shape in its normal load-contacting and ground-contacting part, and having sufficient resilient stretchability of its wall to permit a load-contacting and ground-contacting part of its wall, in its load-flattened part, to be deformed, without wrinkling of said part, from its crowned form to flat form, as by load-sustaining ground contact with a flat ground surface.

2. A load-moving device comprising a roller as defined in claim 1, said roller comprising journal means of which the axis is the axis of the roller, and horizontal-propulsion means associated with said journal means for relative rotation of the two.

3. A load-moving device comprising an axially elongated, flexible-walled, fluid-distensible roller for supporting the weight of a load applied to its outer surface for transportation of the load thereon, said roller comprising journal means of which the axis is the axis of the roller, a load-sustaining structure and revolvable means journaled on said structure and running upon the outer surface of said roller for applying the said weight of the load to the roller, and horizontal-propulsion means having connection to said structure and associated with said journal means for relative rotation of the two for sustaining horizontal propulsion force.

4. A load-moving device comprising an axially elongated, flexible-walled, fluid-distensible roller for supporting a load applied to its outer surface and, in journaled relation thereto, a load-sustaining structure and revolvable means journaled on said structure and running upon the outer surface of said roller for applying the force of the load to the roller.

5. A device as defined in claim 4 in which the recited revolvable means is shaped for load-sustaining contact with said roller, under the force of the load, throughout a part of the surface of the roller that is at least substan- as extensive axially as circumferentially of the roller.

6. A device as defined in claim 4 and including *journal means projecting centrally from the ends of the roller respectively and* a link hinged to the recited load-sustaining structure and connecting it to the recited journal means.

7. A device as defined in claim 6 and including stop means mounted on the recited load-supporting structure and engageable by the recited link for limiting movement of the axis of the distensible roller away from the recited load-sustaining structure.

8. A load-moving device as defined in claim 4 in which the face of the recited revolvable means that contacts the recited fluid-distensible roller is rectilinear axially of said roller throughout their maximum area of contact with each other.

9. A device as defined in claim 4 including means acting otherwise than through the recited roller for driving the recited revolvable means.

10. A device as defined in claim 4 in which the recited revolvable means comprises an endless belt in contact with the outer face of the distensible roller.

11. A device as defined in claim 4 in which the recited revolvable means comprises a plurality of load-sustaining rollers in contact with the outer face of the distensible roller.

12. A device as defined in claim 4 in which the recited revolvable means comprises a plurality of load-sustaining rollers in arcuate arrangement, fore-and-aft of the assembly.

13. A device as defined in claim 4 in which the recited revolvable means comprises a set of more than two load-sustaining rollers and an endless belt surrounding the said set of rollers.

14. A device as defined in claim 4 in which the recited distensible roller has, when distended and free of load, a smoothly curved symmetrically crowned shape in its normal load-contacting and ground-contacting part, and has sufficient resilient stretchability of its wall, in its load-flattened part, to permit a load-contacting and ground-contacting part of its wall to be deformed, without wrinkling of said part, from its crowned form to flat form, as by load-sustaining ground contact with a flat ground surface.

15. A load-moving device comprising a plurality of axially elongated, flexible-walled, fluid-distensible rollers for supporting a load applied to their outer surfaces, journal means coaxial with said rollers respectively, and tie means connecting the journal means of said plurality of the rollers and holding them with their axes spaced apart whereby the said rollers are disposed in tandem relation.

16. A device as defined in claim 15 including a self-laying track extending about the set of rollers.

*17. A vehicle comprising an axially-elongated, flexible-walled, fluid-distensible roller, said roller having, when distended and free of load, a ground-contacting middle portion throughout which the part of the wall which in tension primarily sustains the distending force of the fluid is of longer-radius curvature lengthwise of the roller than circumferentially of the roller, so that the roller is shaped for load-sustaining contact with a flat ground surface throughout an area that is more extensive axially than circumferentially of the roller, the said wall, throughout the said ground-contacting middle portion, having such easy flexibility that its resistance to flexing is not a substantial factor in localizing pressure of roadway projections against the roller, said vehicle including a load-supporting structure, and journal means and horizontal-propulsion means interposed operatively between said roller and said structure.*

*18. A vehicle as defined in claim 17 and including power means for rotating the defined roller in relation to the defined load-supporting structure, so that the defined vehicle is a self-propelled vehicle.*

*19. A vehicle as defined in claim 17 in which the defined roller is of ellipsoidal shape in its ground-contacting middle portion.*

*20. A load-moving device comprising an axially-elongated, flexible-walled, fluid-distensible, ground-contacting roller, said roller having, when distended and free of load, a symmetrically crowned shape in its normal ground-contacting part, and having sufficient resilient stretchability of its wall to permit a ground-contacting part of its wall, in its load-flattened part, to be deformed, without wrinkling of said part, from its crowned form to flat form, as by load-sustaining ground contact with a flat ground surface, the wall of the said roller throughout its said normal ground-contacting part having such easy flexibility as to permit distribution of the roller's ground-contact pressure evenly over substantially the entire area of its current ground contact.*

(References on following page)

References Cited in the file of this patent or the original patent

UNITED STATES PATENTS

| | | |
|---|---|---|
| 646,869 | Perkes | Apr. 3, 1900 |
| 809,048 | Furchtbar | Jan. 2, 1906 |
| 1,257,413 | Sloper | Feb. 26, 1918 |
| 1,394,328 | Miller | Oct. 18, 1921 |
| 1,436,373 | Walk | Nov. 21, 1922 |
| 1,797,713 | Brogelli | Mar. 24, 1931 |
| 2,179,125 | Kirlin | Nov. 7, 1939 |

| | | |
|---|---|---|
| 2,200,661 | Templeton | May 14, 1940 |
| 2,541,928 | Loomis | Feb. 13, 1951 |

FOREIGN PATENTS

| | | |
|---|---|---|
| 702,874 | Germany | Feb. 19, 1941 |
| 512,197 | Great Britain | Aug. 30, 1939 |

OTHER REFERENCES

Publications: "The Rudder" (vol. 66), January 1950, p. 128; "Yachting," April 1, 1951, p. 102.